(12) United States Patent
Johnston et al.

(10) Patent No.: US 10,979,550 B2
(45) Date of Patent: Apr. 13, 2021

(54) MOBILE COMMUNICATION DEVICE

(71) Applicant: Liberty Vaults Limited, Finchley (GB)

(72) Inventors: Christopher Iain Johnston, London (GB); Michel Leduc, Trets (FR)

(73) Assignee: TapNav Ltd, Walton-on-Thames (GB)

( * ) Notice: Subject to any disclaimer, the term of this patent is extended or adjusted under 35 U.S.C. 154(b) by 0 days.

(21) Appl. No.: 14/380,120

(22) PCT Filed: Feb. 25, 2013

(86) PCT No.: PCT/GB2013/050464
§ 371 (c)(1),
(2) Date: Aug. 21, 2014

(87) PCT Pub. No.: WO2013/124689
PCT Pub. Date: Aug. 29, 2013

(65) Prior Publication Data
US 2015/0289134 A1    Oct. 8, 2015

(30) Foreign Application Priority Data
Feb. 23, 2012    (GB) .................................. 1203175

(51) Int. Cl.
*H04K 1/00*    (2006.01)
*H04M 1/673*    (2006.01)
(Continued)

(52) U.S. Cl.
CPC .......... *H04M 1/673* (2013.01); *H04L 9/3242* (2013.01); *H04L 9/3263* (2013.01);
(Continued)

(58) Field of Classification Search
CPC ..... H04W 12/08; H04W 12/06; H04W 8/183; H04W 4/14; H04W 8/18; H04W 88/06;
(Continued)

(56) References Cited

U.S. PATENT DOCUMENTS

| 5,907,616 A | 5/1999 | Brögger et al. |
| 6,195,568 B1 | 2/2001 | Irvin |

(Continued)

FOREIGN PATENT DOCUMENTS

| CN | 1352783   | 6/2002 |
| CN | 1352783 A | 6/2002 |

(Continued)

OTHER PUBLICATIONS

Chinese Patent Application No. 201380021102.5, Filing Date Oct. 21, 2014, First Office Action dated Jul. 5, 2016.

*Primary Examiner* — Amie C. Lin
(74) *Attorney, Agent, or Firm* — Eversheds Sutherland (US) LLP

(57) ABSTRACT

A method of accessing a partition on a mobile communication device may include the steps of receiving data specifying a partition, receiving an identification code from an identification module in or associated with the device, determining, based on both the data specifying a partition and the identification code, whether access to the specified partition is to be allowed, and allowing or denying access to the specified partition accordingly.

37 Claims, 4 Drawing Sheets

(51) Int. Cl.
    *H04W 12/08* (2021.01)
    *H04L 12/947* (2013.01)
    *H04L 12/58* (2006.01)
    *H04W 4/14* (2009.01)
    *H04W 12/06* (2021.01)
    *H04L 9/32* (2006.01)
    *H04M 1/725* (2021.01)
    *H04W 8/18* (2009.01)
    *H04W 88/06* (2009.01)

(52) U.S. Cl.
    CPC .......... *H04L 49/252* (2013.01); *H04L 51/24* (2013.01); *H04M 1/72577* (2013.01); *H04W 4/14* (2013.01); *H04W 8/183* (2013.01); *H04W 12/06* (2013.01); *H04W 12/08* (2013.01); *H04L 2209/24* (2013.01); *H04W 8/18* (2013.01); *H04W 88/06* (2013.01)

(58) Field of Classification Search
    CPC .......... H04W 88/184; H04M 1/72577; H04M 1/673; H04M 1/675; H04M 1/72563; G06F 21/34; G06F 21/60; G06F 21/78; G06F 21/31; H04L 9/3242; H04L 9/3263; H04L 49/252; H04L 51/24; H04L 2209/24
    See application file for complete search history.

(56) References Cited

U.S. PATENT DOCUMENTS

| | | | |
|---|---|---|---|
| 6,961,587 B1 * | 11/2005 | Vilppula | G06Q 20/341 455/410 |
| 6,978,156 B1 | 12/2005 | Papadopoulos et al. | |
| 7,620,814 B2 | 11/2009 | Ondet et al. | |
| 7,710,241 B2 | 4/2010 | Jung | |
| 7,783,308 B2 | 8/2010 | Ogren | |
| 7,787,870 B2 | 8/2010 | Burgan et al. | |
| 8,438,654 B1 | 5/2013 | von Eicken et al. | |
| 8,588,749 B1 * | 11/2013 | Sadhvani | H04M 1/24 379/1.01 |
| 9,225,696 B2 | 12/2015 | Pascariello et al. | |
| 2002/0045457 A1 | 4/2002 | Taniguchi | |
| 2003/0139192 A1 | 7/2003 | Chmaytelli et al. | |
| 2004/0162057 A1 | 8/2004 | Steininger | |
| 2005/0107114 A1 * | 5/2005 | Ocock | H04W 8/183 455/550.1 |
| 2005/0278775 A1 | 12/2005 | Ross | |
| 2006/0105809 A1 | 5/2006 | Luo | |
| 2007/0066288 A1 | 3/2007 | Soelberg et al. | |
| 2007/0094715 A1 | 4/2007 | Brown et al. | |
| 2007/0208743 A1 * | 9/2007 | Sainaney | G06F 17/30867 |
| 2008/0040282 A1 * | 2/2008 | Yamamoto | H04N 7/163 705/52 |
| 2008/0081609 A1 | 4/2008 | Burgan et al. | |
| 2008/0104393 A1 | 5/2008 | Glasser et al. | |
| 2008/0114987 A1 * | 5/2008 | Morris | G06F 21/31 713/183 |
| 2008/0152098 A1 | 6/2008 | Paryzek et al. | |
| 2009/0183010 A1 | 7/2009 | Schnell et al. | |
| 2009/0303019 A1 * | 12/2009 | Trappeniers | G06F 21/34 340/10.41 |
| 2009/0325562 A1 | 12/2009 | Hough et al. | |
| 2010/0048169 A1 * | 2/2010 | Yan | G06F 21/62 455/411 |
| 2010/0299745 A1 | 11/2010 | Karppinen et al. | |
| 2010/0323664 A1 * | 12/2010 | Sivaram | H04M 1/66 455/411 |
| 2011/0028124 A1 | 2/2011 | Sprague et al. | |
| 2011/0053574 A1 | 3/2011 | Rice | |
| 2011/0078762 A1 | 3/2011 | Bijlsma | |
| 2011/0099616 A1 | 4/2011 | Mazur et al. | |
| 2011/0150968 A1 | 6/2011 | Grassi | |
| 2012/0054845 A1 | 3/2012 | Rodriguez et al. | |
| 2012/0117381 A1 * | 5/2012 | Lo | G06F 8/63 713/156 |
| 2012/0278871 A1 * | 11/2012 | Wang | H04L 63/083 726/7 |
| 2013/0212653 A1 | 8/2013 | Hoghaug | |
| 2014/0171024 A1 | 6/2014 | Huang et al. | |
| 2014/0187200 A1 | 7/2014 | Reitter et al. | |

FOREIGN PATENT DOCUMENTS

| | | | | |
|---|---|---|---|---|
| CN | 1177300 C | 11/2004 | | |
| CN | 1177900 C | 12/2004 | | |
| CN | 1950809 | 4/2007 | | |
| CN | 1950809 A | 4/2007 | | |
| CN | 101448340 A | 6/2009 | | |
| CN | 101599129 | 12/2009 | | |
| CN | 101599129 A | 12/2009 | | |
| CN | 102122365 A | 7/2011 | | |
| CN | 102193744 | 9/2011 | | |
| CN | 102193744 A | 9/2011 | | |
| CN | 102203790 | 9/2011 | | |
| CN | 102203790 A | 9/2011 | | |
| CN | 102761870 A | 10/2012 | | |
| DE | 19828735 A1 | 12/1999 | | |
| EP | 681408 A1 | 11/1995 | | |
| EP | 1033048 A1 | 9/2000 | | |
| EP | 1467275 A2 | 10/2004 | | |
| EP | 2192015 | 6/2010 | | |
| EP | 2192015 A1 | 6/2010 | | |
| FR | 2719436 A1 | 11/1995 | | |
| GB | 2408179 A | 5/2005 | | |
| GB | 2454792 | 5/2009 | | |
| GB | 2454792 A * | 5/2009 | .......... | G06F 21/335 |
| JP | HEI10-117229 A | 5/1998 | | |
| JP | 2009017239 A | 1/2009 | | |
| JP | 2009088917 A | 4/2009 | | |
| JP | 2012-073902 A | 4/2012 | | |
| KR | 20130085472 A1 | 7/2013 | | |
| WO | 92/19078 A1 | 10/1992 | | |
| WO | 00/01179 A1 | 1/2000 | | |
| WO | 02/17353 A2 | 2/2002 | | |
| WO | 03/005687 A2 | 1/2003 | | |
| WO | 2006/002794 A2 | 1/2006 | | |
| WO | 2007130123 A1 | 11/2007 | | |
| WO | 2008/042531 A2 | 4/2008 | | |
| WO | 2009/098534 A1 | 8/2009 | | |
| WO | 2011/025807 A1 | 3/2011 | | |
| WO | 2011/073712 A1 | 6/2011 | | |
| WO | 2011150968 A1 | 12/2011 | | |
| WO | 2013101894 A2 | 7/2013 | | |
| WO | 2013124689 A2 | 8/2013 | | |

* cited by examiner

MOBILE COMMUNICATION DEVICE

TECHNICAL FIELD

The present invention relates to the field of mobile communication devices. In particular, it relates to a mobile communication device on which a user can switch between different partitions or profiles.

BACKGROUND OF THE INVENTION

It is currently known to have multiple different users on an operating system in a PC environment using a UID (user ID) combined with a respective password to toggle between them.

It is also known to have dual SIM mobile phones.

People have also considered the possibility of providing a multi-user mobile phone.

However, the inventors of the present invention have realised that there is a desire for a single user to be able to have different profiles or partitions on a single mobile communication device, such as a work profile and a home profile, for example. This could enable them, for example, to keep different aspects of their life separate without having to have multiple devices. As far as the inventors are aware, no mobile communication device currently available allows a user to have multiple profiles or partitions on a single device so that they can partition content (user-generated or otherwise) and functionality between these profiles.

US 2010/0323664 A1 discloses a mobile device for multiple users. Each user has his/her own dedicated memory partition in which they can read/write data. Each partition is associated with a different smart card ID and a user must insert his/her smart card into the device in order to access his/her partition.

GB 2408179 A discloses a mobile telephone for multiple users where each user can configure the telephone to operate in a particular manner. The phone uses a single SIM card and each user must enter a PIN/passcode in order to be able to use the telephone.

SUMMARY OF THE INVENTION

According to a first aspect of the invention, there is provided a method of accessing a partition or switching between partitions on a mobile communication device, the method comprising: receiving data specifying a partition; receiving an identification code from an identification module associated with the device; determining, based on the data specifying a partition and the identification code, whether access to the selected partition is to be allowed; and allowing or denying access to the selected partition accordingly.

The identification module could be or comprise a removable identification module, a remote identification module, a SIM card, hardware, a secure element, a trusted execution environment (TEE), or a software SIM, for example. The identification module could be provided in the device or remotely.

Thus, according to the first aspect, a user can access a partition or switch between partitions on their mobile device only when a verification based on both the data specifying the partition and an identification code from an identification module associated with the device (e.g. a SIM card or hardware or secure element or TEE in the device) has been made. By requiring an identification code from an identification module associated with the device (e.g. a SIM card or hardware or secure element or TEE in the device) as part of the verification process this provides security to the user because a partition can only be accessed on the appropriate device, or on a device with the correct identification module (e.g. SIM card or hardware or secure element or TEE).

Preferably, more than one partition may be accessed and controlled via a single and unique SIM card (or other identification module of the device). More preferably, all of a user's partitions are accessible via a single unique SIM card (or other identification module of the device). Thus, there is advantageously no need for a separate SIM card (or identification module) for each partition accessible on the mobile device, and so no need to switch from one SIM or identification module to another to access different partitions.

A partition may have predefined content and/or functionality.

The data specifying a partition may specify, for example, the content and/or functionality of the partition, a name and/or passcode of the partition, and/or a path to a cloud or external server from which data specifying the content and/or functionality of the partition can be downloaded.

Preferably, the method comprises sending the identification code from the identification module to open the specified partition when access to the specified partition is allowed.

The method may comprise sending or displaying a message indicating that access to the specified partition is not allowed when access to the specified partition is not allowed.

The method may comprise sending the data specifying a partition and the identification code from the identification module to a partition entry module when access to the specified partition is allowed. In this case, the data specifying a partition and the identification code are preferably sent from the identification module to a partition entry module via a secure channel. A secure channel may be created by a mutual authentication process between the identification module and the partition entry module, for example.

The method may advantageously comprise encrypting the data specifying a partition and/or the identification code before sending them to the partition entry module.

An initialisation process for accessing a partition preferably involves associating data specifying a partition (e.g. a PIN or passcode) with identification data from an identification module associated with the device. Thus, more than one data specifying a partition (e.g. a PIN or passcode) may be associated with a single identification data from an identification module associated with the device. The identification code or identification data from the identification module associated with the device could be a unique hardware identifier such as the IMEI (International Mobile Equipment Identity), for example.

Preferably, the data specifying a partition and identification code are verified in the identification module to determine whether access to the specified partition is to be allowed.

The method preferably comprises generating the identification code in the identification module based on the data specifying a partition, and preferably also based on identification data of the identification module.

The identification code may be a certificate, for example, which may be generated from identification data of the identification module and/or the data specifying the partition.

In some embodiments, where one or more partitions are stored in the cloud or at an external server, preferably a mutual authentication process is performed between the SIM (or other identification module) in the mobile communication device and a virtual or physical SIM or SAM (or other identification module) in the cloud before access to the partition in the cloud is allowed. Thus, security levels provided at the mobile communication device may be extended to the cloud. Preferably, the mutual authentication process is performed before the passcode or data specifying the partition is checked.

When a partition is accessed, preferably only content specified to be available in that partition is accessible to the user. In addition or alternatively, a partition may have a predefined configuration or set-up so that when a user accesses that partition their device will automatically change to that configuration. A configuration could, for example, specify device functionality such as ring volume, call divert function, vibrate function, and whether functionalities such as Bluetooth, SMS, MMS and internet are on or off, etc.

Preferably, when a user has accessed a partition on a mobile device, any content, such as SMS/MMS messages, photos, images, videos, documents, browsing history, Internet passwords/usernames etc., obtained (e.g. downloaded onto the device, received via a wireless communication network, or photographs/videos taken by the device) whilst the that partition is accessed is subsequently accessible only when that partition, and perhaps one further partition constituting an "administrator" partition, is accessed on the mobile device. The content could be stored on the mobile device, for example in the partition in which it was obtained and/or, for example, it could be stored remotely in a cloud or server. By using a cloud or other server to store some or all of the partition data remotely, this can provide a useful backup if a mobile device is lost or stolen and/or a larger storage facility in which more data can be stored than on the mobile device alone. Partition data stored remotely from the device may be accessed when a partition is accessed, preferably using the same security steps as for checking access to the partition on the device, i.e. based on the data specifying the partition and an identification code of an identification module associated with the device. Thus, the data in the cloud would only be accessible via the correct mobile device since the identification code from the SIM card or hardware of the device would be required in order to gain access.

A user could set on the device what types of content would fall in the category of only being available in the partition they were obtained in. Other types of content (e.g. emails) could, for example, be accessible in other or any partitions on the device.

Once a partition has been accessed, all audit trails and activity may be kept discretely within the partition. This could include browsing history, call lists and address book, for example.

The term "mobile communications device" includes devices such as mobile telephones (cell phones), wireless PDAs, mobile tablet devices, phablets, televisions, laptop computers (e.g. comprising a SIM card) and generally any device that is capable of communicating wirelessly, e.g. via a wireless (wifi) network and/or via a mobile telephone network.

The present invention can enable a user to partition different aspects of their life such as work, home, school, travel, etc., where only certain information is viewable in each partition. Thus, multiple data, each specifying a partition, may be used in conjunction with a SIM or hardware or other identification module identifier to gain access to different partitions on a mobile device. Such an arrangement allows ease of use, security and the convergence of multiple lifestyle needs within a single device.

In the present invention a user name (UID) is not needed. The present invention is designed for a single user, which means the system can make use of smart object technology in the SIM or other identification module, if all the identities and security algorithms link to the SIM or other identification module, in order to provide security to the system, as the device has partitions rather than separate or discrete identities created on it, and therefore a two factor authentication can be used to allow entry at every point. If the SIM or other identification module is used as the control point, no UID needs to be entered, just data specifying a partition.

If the system were for multiple users this would require user names (Unique Identifiers), such as JBloggs or ASmith, to be entered and this would be impossible if the device were locked. If an input screen were to be created it would also be difficult to undertake on a regular basis. This would essentially render the service either unusable or insecure. However, since the present invention is for a single user and does not require user names, these problems are not present.

Preferably, access to and management of the partitions (e.g. mapping) are controlled by the SIM or other identification module associated with the mobile communication device. Ideally, the SIM card (or other identification module) checks the passcode(s) entered to access the different partitions and allows or denies access to the various partitions based, at least in part, on the entered passcode. Such a system provides greater security than known systems in which partition access and mapping are controlled by an application in the mobile and not in the SIM or other secure element.

Preferably, a mapping table mapping passcodes to their respective partitions is stored in the SIM or other identification module associated with the mobile communication device. This helps the SIM or other identification module be able to control access to the different partitions securely.

In a preferred process, a SIM or other identification module receives data specifying a partition (e.g. a passcode). The SIM or other identification module then preferably verifies the data specifying a partition and creates a certificate, based on the result of that verification. The certificate is preferably generated based on, e.g. by performing an algorithm on, the data specifying a partition (e.g. a passcode) and identification data (e.g. an identifier) of the SIM card or other identification module. The certificate is then preferably transmitted via a secure channel to a processor in the device, via which access to the partitions is controlled.

As explained above, the user may select what data (e.g. which photos, videos, internet browsing history, call logs, internet passwords/usernames etc.) is available in each partition. The partitions may have separate and/or common content, applications, services etc. Thus, a user could select, for example, what media or other content they want to be available in different parts of their life. Moreover, the invention allows a user to use a single device for both home and work purposes, for example, without compromising their work/life integrity.

The selection of what content and/or functionality is available in each partition is preferably performed in an administrator partition (MEA), where the content, settings (e.g. functionality) and identity of the other partitions can be set. A user could use the administrator partition to select or de-select features of the mobile device, such as those described below, to partition content and functionality pertinent to the different partitions.

For example, a user could:

have separate and different address lists in each partition have separate and different browsing histories in each partition have separate and different photos and videos in each partition have separate and different SMS and MMS records in each partition have separate and different lists of calls to send straight to voicemail in each partition send SMS and MMS straight to folders in different partitions without appearing in all partitions synchronise or not synchronise different folders in different partitions to a PC or a cloud have separate and different call timers in each partition to aid in corporate expenses and recharge have separate, different but also complimentary apps in each partition have separate and different email accounts in each partition turn on/off Bluetooth, SMS, voice or data services in each partition not be able to see and content in other partition unless in the administrator partition have separate and different voicemail greetings in each partition Of course, some content and/or functionality may be common or shared between more than one partition.

The user preferably has access to all functionality and content in the MEA. Within the MEA, the user may set up partitions' respective passcodes (see below), for example.

If the user has accessed a particular partition and the device enters a standby mode (e.g. after a certain predefined period of inactivity or following the pressing of a "standby" key), the device will preferably standby in the partition mode it was previously in (i.e. immediately before standby) and follow any conditional formula which has been set up for activity of that partition in that mode. For example, if the user is in a "home" partition, they could configure all calls except for a group called family to be sent directly to voicemail. They could also do the same for all SMS messages received except for the family group again. Any digital content (e.g. media such as audio, images and/or video) which arrives could be sent to the administrator partition, which could either hold or re-file that content based on pre-defined rules to another partition set up by the user.

Preferably, the identification code is received from and may correspond to or be based on a SIM card in the device. This provides security because if the SIM card is removed from the device all the content on the device is locked as it is no longer possible for someone to enter a partition; the identification code from the SIM is required in order for access to the partition to be allowed. The user is secured because if the SIM is removed or remotely deactivated, the verification process will no longer work due to lack of one of its elements (the SIM identification code), so the content is locked securely in the device. This would also be the case if the partition content were stored in a cloud or another external memory device; the lack of a SIM would prohibit access to any partition. Removal of the SIM would lock all partition content and insertion of a new SIM would not unlock the content as it would not have the correct identification code.

Preferably, the SIM is based on a JavaCard. This provides the possibility for the SIM to manage different applets, one for each partition, with independent security features. These applets could be used to control access to each of the partitions on the device.

In one preferred embodiment, the data specifying a partition comprises a passcode for the specified partition. The passcodes for the partitions may each comprise letters and/or numbers and are preferably 1-9 digits long, more preferably 3 or 4 digits long. Preferably, they are solely numeric passcodes. The passcodes for different partitions may have the same or differing lengths.

With the present invention, entry into a selected partition may therefore be allowed or denied based on both a passcode for a partition and an identification code from a SIM or hardware of the device. For example, both the passcode and the identification code could have to match those stored in the device for the selected partition for access to the selected partition to be allowed.

However, preferably, the identification code or identification data (from a SIM card or hardware or other identification module in or associated with the device) and the passcode are passed through an algorithm to create a certificate or hash. Preferably, the algorithm comprises an encryption algorithm such as a PKI (public key infrastructure) algorithm, for example. The certificate or hash may then be compared with a predefined certificate or hash for the selected partition (see below for a description of a preferred form of this) and, if the two certificates or hashes match, access to the selected partition can be allowed. This provides a secure system because user authentication can be verified at each point. This means that network services and audit trails can be used with full integrity. A mobile phone carrier, for example, can be confident that a user is the lawful and contracted user of the device who is financially and legally responsible for all activity undertaken with the device.

Preferably, once a certificate or hash has been created, both the certificate or hash and the SIM or hardware or other identification module identifier are passed to a verification module which decrypts the certificate or hash to provide the passcode for the partition and passes the user to the partition they were seeking to access, providing entry is allowed. Entry is allowed if the certificate or hash corresponds to a predefined certificate or hash for the partition.

The passcode is preferably entered by a user of the device. A user could enter the passcode by touching on a touch-sensitive screen or a keypad of the device, for example.

Alternatively, the data specifying a partition could be received from a signal-emitting device. Preferably, the data is received wirelessly. The signal-emitting device could be a NFC (near field communication) tag, for example. In this way, a user may access a partition on their device by, for example, holding their device by a NFC tag for a selected partition. For example, a user could have a tag at home, a tag at work, a tag in the car, etc. When a user moves to a different part of their life (e.g. home, work, car) they can receive a signal from the relevant tag and their device will automatically access the relevant partition based on their location.

The tags or other signal-emitting devices may be used as environment descriptors. Preferably, a signal-emitting device contains an encrypted version of a passcode or a hash representing the passcode, which it can transmit wirelessly to a mobile device held near the signal-emitting device. Preferably, the signal-emitting device also contains a unique ID corresponding to that signal-emitting device. The signal-emitting device could also contain information relating to its environment such as a "post it" (information) from other people in the environment. This information could then be transmitted from the signal-emitting device to a mobile device.

As an alternative to using NFC tags (which not all mobile communication devices may be able to read), Flashcode could be used to implement a similar system. However, this might reduce security and some features such as the "post-it" provision might not be possible. For these reasons, NFC tags are preferred to a Flashcode-based system.

A passcode could be required to be entered by the user to switch the device into an NFC or Flashcode tag controlled mode, where partitions may be accessed based on an NFC or Flashcode signal received by the device. Requiring a passcode in this way could reduce the potential security risk associated with using Flashcode, or even with NFC tags on which the security may be limited for cost reasons.

The data specifying a partition could, for example, comprise data specifying the content and/or functionality available in that partition instead of or in addition to a passcode for that partition. In this way, a new partition could, for example, be set-up on a device with a specified configuration. This could be useful, for example, in a cinema, hospital or library, where a device could receive a signal (e.g. from a NFC tag) causing it to enter a "cinema" partition where vibrate is turned off and the ring volume is set to "silent".

The NFC tags, or other signal-emitting devices, could be set-up to contain the information specifying a partition before they are sold to a user. For example, a number of pre-defined partitions could be provided on respective signal-emitting devices with settings appropriate for "home", "car" and "office" use. Alternatively, or additionally, a user could set up their own signal-emitting devices with information specifying partitions by coupling the signal-emitting devices to their computer. The information provided to the signal-emitting devices from the computer could be defined by the user themselves or it could be information downloaded from the internet specifying a pre-defined partition that a user might wish to use. In an alternative embodiment, the data specifying a partition could comprise data specifying a path to data on a cloud or server where details of the partition are located. These details could comprise data specifying the content and/or functionality of the partition, for example. The path specified by the data is preferably a unique and secure path.

Preferably, the first time a communication device receives a signal from a signal-emitting device specifying a path for a particular partition, as described above, the communication device sends a signal to the cloud or server specified by that path and, in response, receives data from the cloud or server specifying a partition (i.e. its content and/or functionality). The partition (e.g. its functionality and, optionally, its content) may then be saved on the communication device. The content need not necessarily be stored on the communication device itself. It could, for example, be stored remotely, for example in a cloud or server, and then accessed when required by the user of the device.

The next time the communication device receives a signal from the same (or another) signal-emitting device to enter that partition, the communication device may enter that partition based on the data specifying that partition that is already saved on the mobile communication device. There would be no need for the communication device to send and receive a signal from the cloud or server as the device would already contain the data required to access the specified partition. In one example, the user or another person (e.g. a controller of the partition, in the case of a partition which may be accessed by more than one user/communication device) may update the data specifying the partition (e.g. its content and/or functionality) that is stored in the cloud or server. Then, when a communication device receives a signal from a signal emitting device to access that partition, preferably that signal also contains data specifying that the partition has been updated and, even if the device already has the partition (before the update) stored thereon, it preferably sends a signal to the cloud or server specified by the path and, in response, receives data specifying the updated partition (e.g. its content and/or functionality) which is then accessed on the communication device. The updated partition may then be stored on the communication device.

The partitions specified by the signal-emitting devices could be "open" or "closed".

If a signal-emitting device emits information specifying a partition that is deemed to be "open", this would mean that a mobile communication device user could receive that signal and then access the specified partition on their device. This could be useful in public spaces such as cinemas and hospitals, for example.

In contrast with this, when a signal-emitting devices emits information specifying a partition that is deemed to be "closed", this would mean that a mobile communication device user might have to enter a code or password before their device could enter the specified partition. In this way, only users in possession of the correct code or password could enter closed partitions on their device. This could be useful in spaces such as schools or corporations where only certain people would wish to, or would be wished to be allowed to, access a particular partition.

In order to switch between the partitions on a device, preferably the user "locks" the device such that the device leaves its current partition. The user may then access a different (or the previous) partition by entering the passcode for that partition or by holding the device on or near a signal-emitting device, for example. The input passcode is then preferably passed to the entry application, as described above, and if entry is allowed, the device then enters the selected partition.

Alternatively, a user may switch between partitions without first having to lock their device.

Content of a particular partition may be encrypted. The content could be stored in the partition on the mobile device or it could be stored elsewhere, for example in a cloud or server, which is accessible when a user accesses the partition on their mobile device. If the content is encrypted, the method of accessing a partition preferably comprises decrypting any encrypted content of that partition (wherever that content is stored). The encryption and decryption of the content could be based on the passcode for the partition and/or the identification code for the SIM or hardware in the device, for example. The encryption/decryption of the content could therefore be based on the same encryption algorithms as those used to create a hash, for example.

In some embodiments, it might not be desirable for the content to be encrypted.

In a preferred embodiment of the invention, a single user is considered with a single unique SIM card inserted into the SIM slot of his/her mobile communication device. All of the secrets and partition allocations are ideally under the control of this one unique SIM. The SIM is ideally the safe box for all of the secrets (e.g. the identification code of the SIM or other hardware or secure element of the device). Preferably, when appropriate passcodes are sent from the SIM, authorization certificates are provided through a secure channel to a main processor in the mobile communication device which manages the access to the different partitions. Passcode verification is ideally done in the SIM by a secure processor of the SIM. The security features of the SIM smart card allow it to create a secure channel with the main processor in the mobile communication device to ensure confidentiality of the authorization certificates which are sent to open the targeted partitions.

In some embodiments, different telephone numbers may be associated with different partitions on or associated with a single communication device. These may be domestic or international numbers, for example. Thus, messages sent to a particular telephone number can be automatically stored in the partition with the telephone number to which they were sent. The partition could be on the device or in the cloud or a remote server, for example. Messages sent and calls made from a particular partition (i.e. the device is in that partition) could automatically be sent from the telephone number associated with that partition so that replies/responses to such messages or calls would be directed back to the same telephone number and partition.

In some embodiments, the device or a partition on the device may be configured such that the device automatically switches to a different partition at a predefined time. For example, when a device is in a "school" or "work" partition, it could be set to automatically enter a different partition (e.g. a "home" partition) at a time corresponding to the end of the school-day or work-day. The device could then automatically re-enter the "school" or "work" partition at the start of the next school-day or work-day. The device may also be configured to switch to different partitions at different times during the school-day or work-day (e.g. break or lunch times). In these partitions, the user could, for example, be allowed access to the Internet and/or email and/or SMS messages, which might be denied at other times during the school-day or work-day, when in the "school" or "work" partition.

Alternatively or additionally, a partition may be configured to adjust its settings automatically at certain times. For example, when in a "school" or "work" partition a user could, for example, be allowed access to the Internet and/or email and/or SMS messages, which might be denied at other times during the school-day or work-day.

Settings to automatically switch partitions and/or change the functionality/settings of a partition at predefined times could be transmitted to a device when entering a partition (e.g. a "school" or "work" partition) for the first time, for example when tapping on a signal-emitting device such as an NFC tag for the first time. The user would then not have to re-tap on the signal-emitting device each time they wanted to enter that partition. Rather, their device would be configured to leave and re-enter that partition automatically at pre-defined times. The pre-defined times could be set by an administrator of the "school" or "work" partition, which could be some one other than the user of the mobile communication device.

According to a second aspect, there is provided a mobile communication device comprising a partition entry module, wherein the partition entry module is arranged to: receive data specifying a partition; receive an identification code from a identification module associated with the device; determine, based on both the data specifying a partition and the identification code, whether access to the specified partition is to be allowed; and allow or deny access to the specified partition accordingly.

The identification module could be or comprise a removable identification module, a remote identification module, a SIM card, hardware, a secure element, a trusted execution environment (TEE), or a software SIM, for example. The identification module could be provided in the device or remotely.

As with the first aspect, preferably the identification code is received from and corresponds to or is based on the SIM card or other identification module associated with or provided in the device.

The partition entry module is preferably stored in a memory in the device's hardware.

The data specifying a partition may comprise a passcode for the specified partition.

The SIM card or other identification module is/are preferably arranged to verify the data specifying a partition and the identification code to determine whether access to the specified partition is to be allowed.

The SIM card or other identification module is/are preferably arranged to generate the identification code based on the data specifying a partition.

The identification code may be a certificate generated from identification data of the SIM card or other identification module The SIM card or other identification module is preferably arranged to send the identification code to open the specified partition when access to the specified partition is allowed.

The device may be arranged to send or display a message indicating that access to the specified partition is not allowed when access to the specified partition is not allowed.

The SIM card or other identification module is preferably arranged to send the data specifying a partition and the identification code to a partition entry module when access to the specified partition is allowed. In this case, the SIM card or other identification module is ideally arranged to send the data specifying a partition and the identification code to a partition entry module via a secure channel. The secure channel may be created by a mutual authentication process between the SIM card or other identification module and the partition entry module, for example.

The device may comprise means for encrypting the data specifying a partition and/or the identification code before sending them to the partition entry module.

The device may comprise keys and/or a touch-sensitive screen, and the partition entry module may be arranged to receive the passcode when a user presses the keys and/or the touch-sensitive screen so as to enter the passcode.

Preferably, the partition entry module and/or SIM card or other identification module comprises a hash creation module and the hash creation module is arranged to pass the identification code and the passcode through an algorithm to create a hash. The algorithm preferably comprises an encryption algorithm, which is preferably a PKI encryption algorithm.

The partition entry module preferably comprises a verification module arranged to compare the hash with a predefined hash for the partition, and to allow access to the partition if the two hashes match.

The device may comprise a receiver arranged to receive data specifying a partition from a signal-emitting device. Preferably, the data from the signal-emitting device is received wirelessly. The signal-emitting device could comprise a NFC tag, for example.

Content of a particular partition may be encrypted for security reasons. Therefore, the device may comprise decryption means for decrypting any encrypted content of an accessed partition.

According to a third aspect, there is provided a method of creating a partition on a mobile communication device, the method comprising: inputting a passcode for the partition;

and setting what content and/or functionality is available in the partition. According to this aspect, a user may, for example, set up a partition on their device and specify what content and configuration/functionality they wish that partition to have. Thus, they could, for example, set up partitions with content and functionality tailored to different aspects of their life.

The method may comprise inputting a name or identifier for the partition, so that it can quickly and easily be identified by a user (e.g. "home", "work", etc.). Preferably, the method comprises passing the passcode through an algorithm to create a hash. This hash may then act as a predefined hash for the partition which can be checked against a further hash when access to the partition is later sought. Preferably, the method also comprises passing an identification code or identification data from a SIM card or hardware or other identification module in or associated with the device through the algorithm with the passcode to create the hash. Preferably, the algorithm comprises an encryption algorithm, which is preferably a PKI encryption algorithm. This makes the hash more secure. The hash may be stored in the device, for example. Alternatively or additionally it may be stored remotely, such as in a cloud or an external memory device. The method may further comprise encrypting the content that is available in the partition. This provides further security to a user. Preferably, a passcode and/or an identification code or identification data from a SIM card or hardware or other identification module in or associated with the device would be used to encrypt the content. The method may comprise decrypting the content when the partition is accessed.

The method preferably comprises storing the passcode for the partition in a SIM card or other identification module of the device.

The method preferably comprises receiving identification data from a SIM card or other identification module of the device and generating an identification code for the partition based on the passcode and the identification data. In this case, the method may further comprise storing the identification code in the device, preferably in a mapping table for the partitions in the device.

According to a fourth aspect, there is provided a mobile communication device comprising a partition creation module, the partition creation module being arranged to: receive a passcode for a partition to be created; create a partition on the device corresponding to that passcode; and set what content and/or functionality is available in that partition.

The partition creation module may be further arranged to receive a name or identifier for the partition.

Preferably, the partition creation module is arranged to pass the passcode through an algorithm to create a hash. Preferably, the partition creation module is further arranged to pass an identification code or identification data from a SIM card or hardware or other identification module in the device through the algorithm with the passcode to create the hash. Preferably, the algorithm comprises an encryption algorithm, which is preferably a PKI encryption algorithm.

The partition creation module may be arranged to store the hash in the device.

Alternatively or additionally, the partition creation module may be arranged to store the hash remotely, preferably in a cloud or an external memory device. The device preferably comprises an administrator partition and the partition creation module is only accessible or operable when in the administrator partition. Thus, preferably, a user must be in the administrator partition in order to create, modify and control partitions on their device. The administrator partition could be stored on the mobile device or it could be stored in a cloud or external hardware device to be accessed locally or wirelessly.

The content that is accessible in a partition may be encrypted. The device may therefore comprise decryption means arranged to decrypt the encrypted content of a partition when a user accesses that partition.

The passcode for the partition is preferably stored in a SIM card or other identification module of the device.

The partition creation module is preferably provided in the SIM card or other identification module of the device.

According to a fifth aspect, there is provided a system comprising a mobile communication device and at least one signal-emitting device, wherein the devices are arranged such that when the mobile communication device receives a signal from a signal-emitting device specifying a partition, the mobile communication device accesses the partition specified by that signal. Thus, signal-emitting devices may be used to make a mobile communication device enter a specified partition and there is not necessarily any need for a user to interact with their device (e.g. by pressing keys or a touch-sensitive screen).

Preferably, the at least one signal-emitting device emits signals wirelessly. It could comprise a NFC tag, for example.

The signal specifying a partition may comprise a passcode for that partition.

Alternatively or additionally, the signal specifying a partition may comprise information specifying what functionality the mobile communication device will have in that partition and/or what content will be available. Thus, a signal from a signal-emitting device may be used to cause a mobile device to enter a partition where the functionality of that partition and/or the content accessible when in that partition is specified in the signal received from the signal-emitting device. In this case, the signal from a signal-emitting device could cause the partition to first be created on the mobile device and then cause the mobile device to enter that partition. This could happen automatically when a mobile device receives a signal from a signal-emitting device or a user could be required to enter a code or password for the partition before a new partition can be created. Once the partition has been created for the first time, if a user receives a further signal to enter that partition this could then happen automatically, for example, without requiring the user to enter the code or password again. Alternatively, a user could be required to enter a code or password for the partition each time their mobile device receives a signal to enter it.

The fifth aspect of the invention also extends to a signal-emitting device (or transmitter) arranged to send a signal specifying a partition to a mobile communication device such that when the mobile communication device receives the signal the mobile communication device accesses the partition specified by that signal.

According to a sixth aspect, there is provided a method of accessing a partition on a mobile communication device, the method comprising: receiving a signal from a signal-emitting device, the signal comprising information specifying a partition on a mobile communication device; and accessing that partition based on the received signal. Thus, as with the previous aspect, signal-emitting devices may be used to make a mobile communication device access a partition and there is not necessarily any need for a user to interact with their device (e.g. by pressing keys or a touch-sensitive screen).

The signal specifying a partition may comprise a passcode for the partition. The method may comprise accessing a partition on the device corresponding to the received passcode.

The signal specifying a partition may comprise information specifying what functionality the mobile communication device will have and/or what content will be available when that partition is accessed. Thus, as with the previous aspect, a signal from a signal-emitting device may be used to cause a mobile device to enter a partition where the functionality and/or content of that partition is specified in the signal received from the signal-emitting device.

Preferably, the signal-emitting device emits signals wirelessly. It could comprise an NFC tag, for example.

According to a seventh aspect, there is provided a mobile communication device comprising: a receiver for receiving a signal comprising information specifying a partition on a mobile communication device; and partition access means for accessing a partition based on the received signal.

The receiver may be arranged to receive a passcode for a partition and the partition access means may be arranged to access the partition that corresponds to the received passcode.

The partition access means may be arranged to create a partition based on partition configuration information contained in the received signal, and to then access that partition.

Preferably, the receiver is arranged to receive a signal wirelessly, such as a signal from a NFC tag, for example.

According to an eighth aspect, there is provided a method of accessing a partition on a mobile communication device comprising selecting a partition from a list of available partitions displayed on the device, and then accessing the selected partition. Thus, a user may simply and easily access a partition on their device by selecting a partition from a list of available partitions displayed on the device.

The partitions may have predefined accessible content and/or functionality such as the content and functionality described above.

The list of available partitions may comprise a list of partition names.

Alternatively or additionally, the list of available partitions may comprise a list or array of images representing the respective partitions.

The method preferably comprises the user touching keys and/or a touch-sensitive screen of the device in order to select a partition from the list.

In a preferred embodiment, after a partition has been selected, a user must enter a passcode for that partition before the partition can be accessed. This provides security since a person must know the passcode for a partition in order to be able to enter it.

According to a ninth aspect, there is provided a mobile communication device comprising at least two partitions and a partition access module, wherein the partition access module is arranged to: cause a screen on the mobile communication device to display a list of available partitions; receive data specifying a partition selected from that list; and allow access to the selected partition.

Preferably, the partition access module is arranged to only allow access to a selected partition if it receives a correct passcode for that partition.

According to a tenth aspect, there is provided a computer program for accessing a partition on a mobile communication device, the program being configured to perform the following steps when executed on a mobile communication device: receive data specifying a partition; receive an identification code from a SIM card or hardware in the device; determine, based on both the data specifying a partition and the identification code, whether access to the specified partition is to be allowed; and allow or deny access to the specified partition accordingly.

According to an eleventh aspect, there is provided a computer program for creating a partition on a mobile communication device, the program being configured to perform the following steps when executed on a mobile communication device: receive a passcode for the partition; and set what content and/or functionality is available in the partition.

According to a twelfth aspect, there is provided a computer program for accessing a partition on a mobile communication device, the program being configured to perform the following steps when executed on a mobile communication device: receive a signal from a signal-emitting device, the signal comprising information specifying a partition on a mobile communication device; allow access to that partition based on the received signal.

According to a thirteenth aspect, there is provided a computer program for accessing a partition on a mobile communication device, the program being configured to perform the following steps when executed on a mobile communication device: display a list of available partitions on a screen of the mobile communication device; receive information corresponding to a partition selected from that list; and allow access to the selected partition.

According to a fourteenth aspect, there is provided a computer readable medium with a computer program according to any of the tenth to thirteenth aspects of the invention stored thereon.

The various aspects of the invention may comprise any of the optional or preferred features of the other aspects of the invention. In order to avoid repetition, not all of the optional or preferred features have been described under each aspect of the invention.

The various aspects of the present invention have a number of possible applications. They could be of particular benefit, for example, when used in places such as cinemas, libraries, hospitals and schools. For example, a public NFC tag (i.e. a tag emitting a signal specifying a partition which anyone is free to access on their mobile device, without having to enter a code or password into their device) could be located at a cinema. Before customers at a cinema watch a film, they could hold their mobile device near the tag and a signal would be sent from the tag to the device causing the phone to enter a "cinema" partition, where, for example, the device's volume is set to "silent" and vibrate is turned off. Calls could, for example, be sent straight to voicemail.

Preferred embodiments of the invention will now be described by way of example only and with reference to the accompanying drawings in which:

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
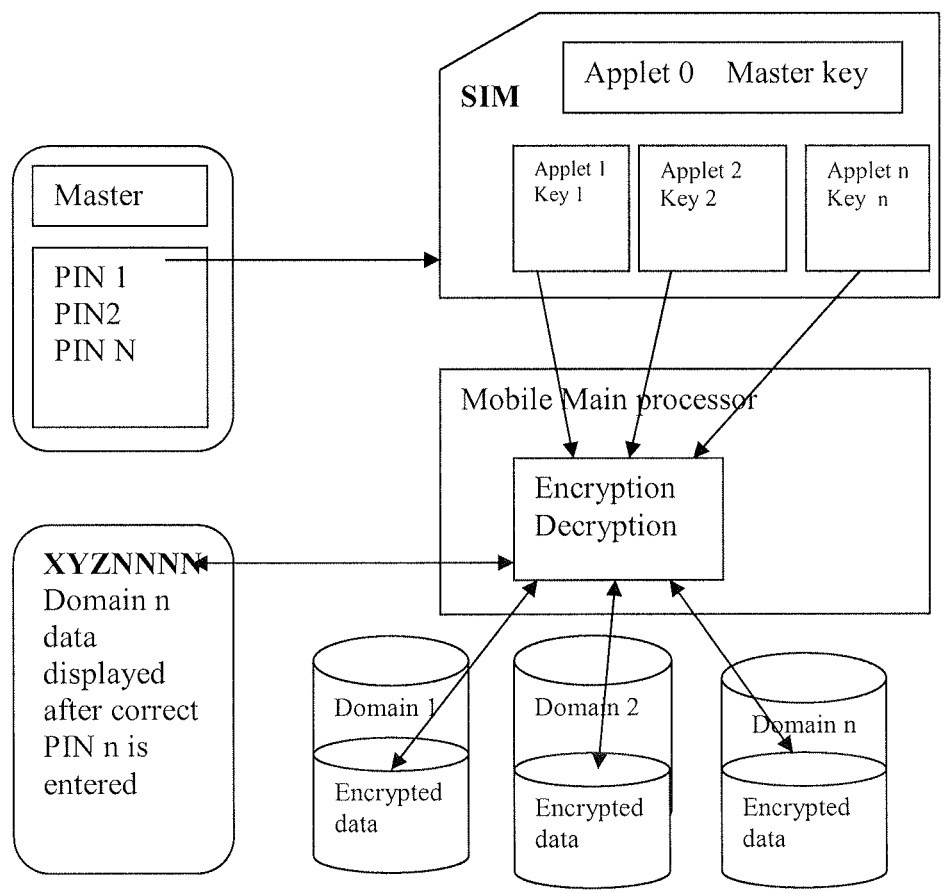
FIG. 1 shows an embodiment of the basic security architecture on a mobile phone.

FIG. 1 shows a preferred embodiment of the basic architecture of a mobile phone with n partitions (domains).

The SIM card is a JavaCard with n applets, one for each partition. Applet 0 is labelled "Master key" and is the applet for the "Administrator partition" described above, from which all the other partitions can be managed.

The phone also has a main processor where encryption and decryption are performed and access to a partition is checked and allowed or denied.

The data partition memory of the mobile phone is divided into n partitions. Access to each partition is controlled by an applet inside the SIM module. An applet is provided for each partition. The main function of each applet n is to control access to the partition n and to provide the appropriate key to the main processor to perform encryption/decryption of the data on the respective partition.

Access to each partition is protected by the SIM. A user must enter the correct passcode to access a given partition and for the encrypted data inside that partition to be decrypted.

When a user wishes to enter a particular partition then enter the passcode or PIN for that partition by typing on the keypad or touch-sensitive screen of the mobile phone. The entered passcode is then passed to the SIM where it is received by the corresponding applet and passed through a PKI encryption algorithm combining it with the SIM identifier to create a hash.

This is illustrated in the following table:

| Partition | Pass code number | Pass code Input # × $2^{128}$(PKI) × SIM/IMEA | Hash Answer |
| --- | --- | --- | --- |
| Work | Up to 9 digits | Run Algorithm | Secure Answer |
| Home | Up to 9 digits | Run Algorithm | Secure Answer |
| Children | Up to 9 digits | Run Algorithm | Secure Answer |
| Travel | Up to 9 digits | Run Algorithm | Secure Answer |
| Social | Up to 9 digits | Run Algorithm | Secure Answer |

The hash is then passed to a main processor on the mobile phone where it is decrypted to extract the PIN and identify which partition the user is seeking to access. Then, if the hash correspond to a hash already stored in the phone's memory for that partition (or stored remotely, such as in a cloud or external memory storage device), access to the requested partition is allowed and the phone enters that partition.

The content accessible in each partition is encrypted, so when access to a particular partition is allowed, the content of that partition is decrypted using the passcode for the partition and SIM identifier. The content is stored in a database which is either stored in the device itself or remotely, such as in a cloud or internal hardware device. Separate data domains or a single database with partition flags could be used. The flags in such a database can indicate which data is accessible to which partition.

When a partition has been entered and its content decrypted, the content can be viewed on the phone's screen and the phone has the configuration or set-up (functionality) corresponding to that partition.

As the data are encrypted, a direct access to the memory will deliver encrypted data. So no sensitive information will be available by these means.

The SIM module is based on a JavaCard. This offers the possibility to manage different applets with independent security features. If the SIM used for this function is also the phone operator SIM, the master key of the SIM will allow controlling the SIM and the telecom connection with a master PIN. This means that first the SIM needs to be unlocked before one of the encrypted partitions can be unlocked (as is the case in a basic mobile phone).

On the other hand, if the SIM used for partition memory partitioning control is not the operator SIM but a second secure element in the phone, a master key is not needed.

In order to manage the content and functionality of each partition, a user has to enter the administrator or master partition. From here, all the other partitions can be managed and the user can set what content is visible and what functionality is available as well as other phone settings such as volume, vibrate and call divert.

When, for example, a photo or video is taken with a camera in the phone, that photo or video is automatically accessible when in the partition in which the phone was when the photo or video was taken. As a default setting, it is not available in any other partitions except the administrator partition. If a user wants to make that photo or video available in a different or other partitions, he/she can manage this in the administrator partition.

The domains 1-n could be data keys which specify data flags held in a single database against content or functionality.

Figure 2:
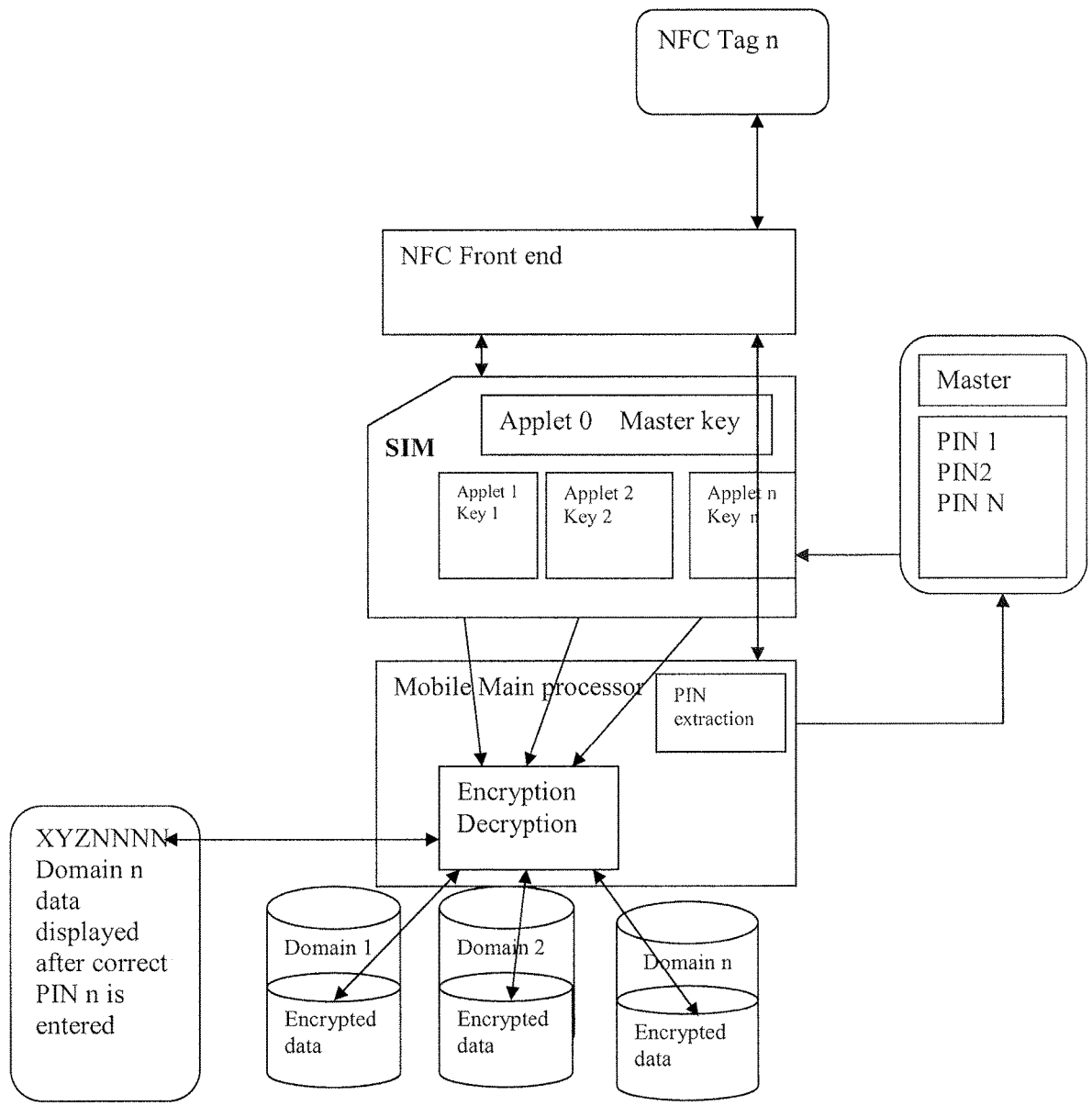
FIG. 2 shows a schematic diagram of an embodiment of the basic security architecture on a mobile phone with NFC communication.

FIG. 2 shows an embodiment of the architecture of a mobile phone with n partitions (domains) which is configured to access the partitions using NFC tags.

This embodiment is similar to that of FIG. 1 except that the phone additionally comprises an NFC front end which can send signals to NFC tags and receive signals from NFC tags.

This embodiment works in the same way as that of FIG. 1 except that the passcode for a particular partition is received from an NFC tag, rather than being input by a user.

In addition, the phone can receive a signal from an NFC tag instructing it to set up and enter a new partition on the phone with a configuration defined in the signal received from the tag. Alternatively, the signal could comprise a unique and secure path to data specifying a partition stored on a server or in a cloud, which the phone accesses after it has received the path from the NFC tag. If the tag sends a signal to enter an "open" partition, then the phone enters that partition automatically. However, if the tag sends a signal to enter a "closed" partition, then the user has to enter the correct code or password for the partition before they can enter it on their phone.

Figure 3:
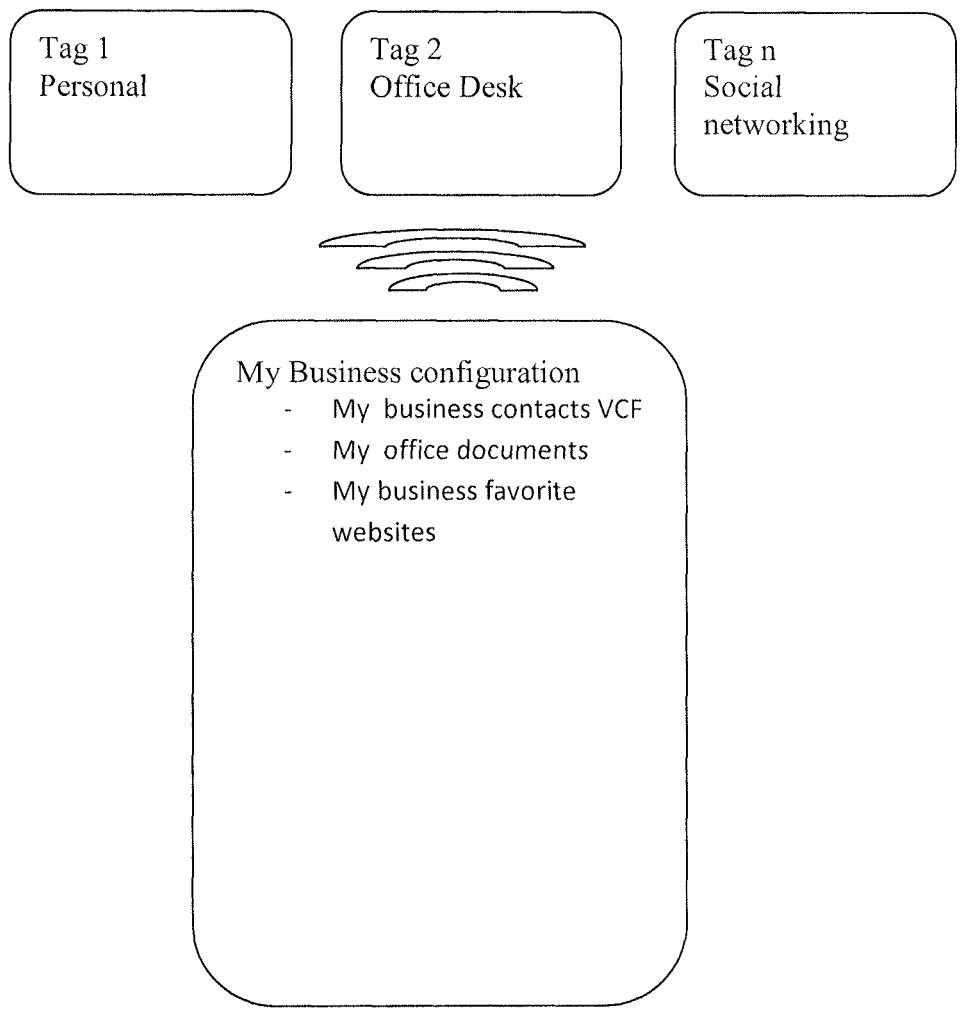
FIG. 3 is an illustration of an embodiment using NFC tags.

In one example, when the phone of FIG. 2 is held near an NFC tag, the following steps are performed:

- the phone receives a signal from the tag, the signal containing data comprising a passcode for a partition and also identification information relating to the tag
- the passcode is extracted from the received signal by a specific applet provided in the SIM card of the device
- the environment/location is determined from the received signal either from a certificate or encrypted passcode contained in the signal, or from the identification information relating to the tag
- additional information (such as a "post-it" containing information form previous users of the tag) can also be received from the tag the tag is updated by updating a certificate if, for security reasons, it is valid just for one session/use, and/or by erasing any additional information such as a "post-it" if it has been downloaded into the mobile device FIG. 3 shows a mobile phone in communication with an "Office desk" tag, where the phone has entered the "Office desk" partition with the set-up shown in the figure. In this case, the tag simply sent the phone a passcode to enter the "Office desk" partition, which already existed on the mobile phone.

A specific application of the present invention will now be described.

In schools, a big problem can be how to control the use of mobile phones (or other mobile communication devices) to protect children against spam or SMS/MMS messages in the classroom, which could disrupt lessons, to avoid the use of such devices during exams, and to filter/control internet access such that certain, e.g. undesirable, websites are not accessible.

By using the present invention, pupils can configure their mobile phones to enter a commonly agreed mode (or partition) when they enter the school premises or a classroom by holding their phones next to an NFC tag sending a signal for the phone to enter a "school" partition whose configuration (i.e. accessible content and available functionality) is set by the school. For example, a pupil's phone could switch between the following partitions during a school day:

At home—device is in "home" partition where:
  SMS/MMS: allowed
  Phone directory/contacts: fully accessible
  Accessible content: "home" data
  Internet access: freely allowed or under parental control
At school—device is held by an NFC tag such that it enters a "school" partition where:
  SMS/MMS: blocked
  Phone directory/contacts: only parents/doctor/urgent contact accessible
  Accessible content: "school" data with free access such that teachers can control this content
  Internet access: blocked or filtered such that only certain websites can be viewed
In an exam room—device is held by an NFC tag such that it enters an "exam" partition where:
  SMS/MMS: blocked
  Phone directory: only parents/doctor/urgency
  Data partition: Blocked
  Internet access: Blocked The "school" partition (or any other partition) could have time-dependent functionality. For example, SMS/MMS/call functionality could be available only at certain pre-defined times of the day, corresponding to break and lunch times, for example. At other times, SMS/MMS/call functionality could be disabled or only allowed to a specified list of "emergency" numbers (e.g. home, parents, carer).

Figure 4:
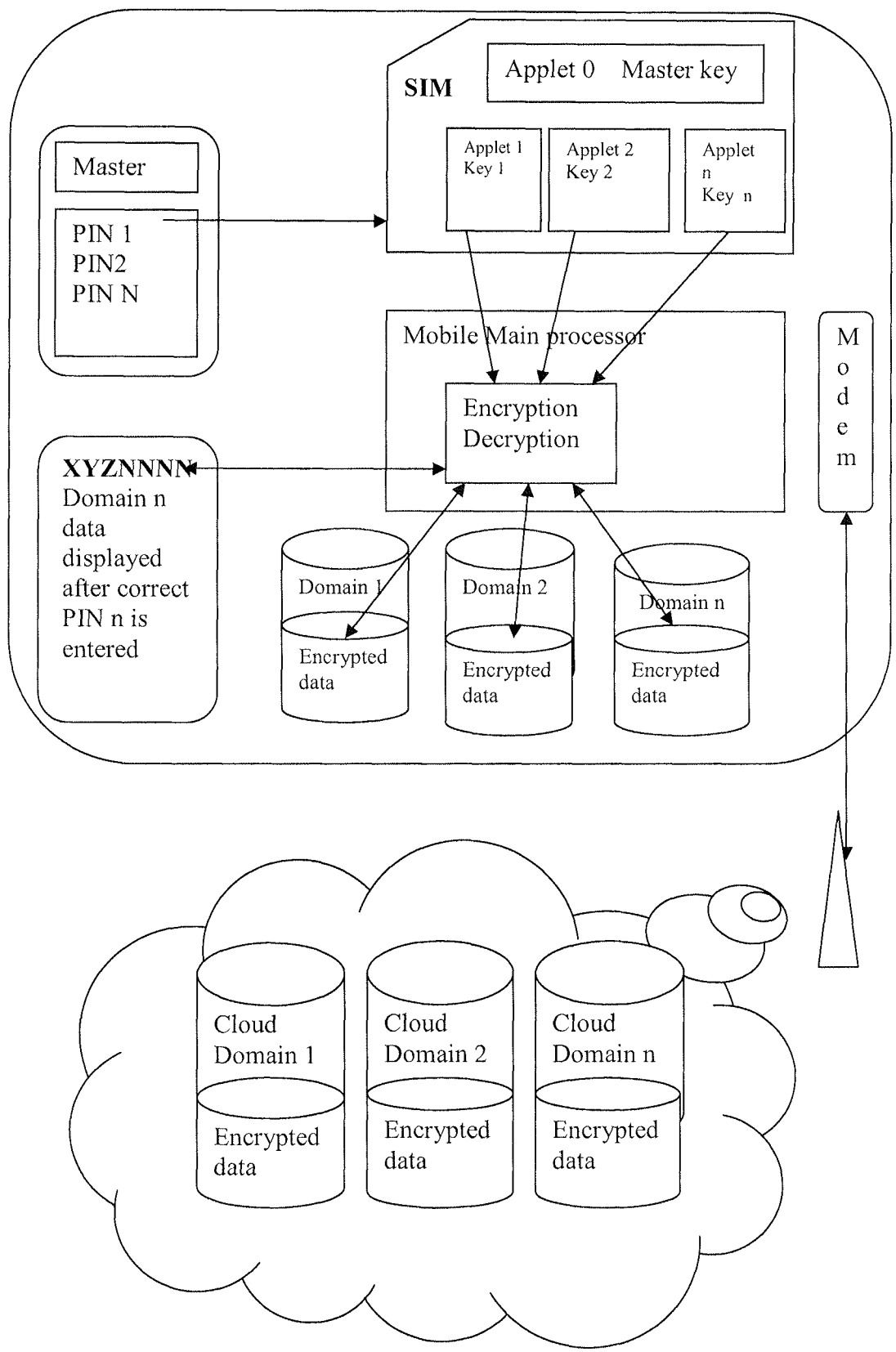
FIG. 4 is an illustration of an embodiment where partition data is stored in a cloud.

FIG. 4 illustrates an embodiment where partition data is stored remotely in a cloud accessed via a modem.

Here, the same data partitions are provided on the cloud as on the mobile phone. This means that data stored in partitions on a mobile phone are replicated on a cloud and can be retrieved from the cloud in the case, for example, that the mobile phone is lost or stolen.

As well as providing a replication of partition data, the cloud provides data banks which can store more (additional) data than is stored or storable on the mobile device with its limited memory size. The additional data that is stored in the cloud, but not on the mobile, can be downloaded to the mobile phone in each respective partition when required by a user.

The security of the partitions in the cloud is managed the same way as on the mobile phone and is based on the same encryption and preferably also on the same passcodes to access the encrypted areas. This means that the access to the encrypted area of a given partition on the cloud is managed from the SIM of the mobile phone.

The process is as follows: when the mobile phone is connected to the cloud, a mutual authentication process is managed between the mobile phone SIM and the SAM or virtual SAM on the Cloud server. Then, if the correct PIN N is entered into the mobile phone, access will be granted both to the partition N inside the mobile phone memory and to partition N inside the cloud. This allows, for example, synchronisation between the partition on the mobile phone and the corresponding partition on the cloud (or synchronisation of particular areas of the partitions). Data transfer can be performed securely via a secure data channel created following a successful mutual authentication process.

A Trusted Services Manager (TSM) can be used to manage this process securely.

A TSM is an Over The Air (OTA) trusted service which controls the management of secure elements, keys and applications for mobile phones. An NFC mobile phone based on a JavaCard SIM makes it possible to download cardlets securely and the associated security elements Over the Air.

A TSM system could include, for example, the capability to perform the following steps:

| Step | Customer experience | CASSIS solution features |
|---|---|---|
| Service enrollment | The mobile phone user/customer triggers with a single click on their phone the downloading of NFC applications onto the phone | Auto-provisioning platform Download Manager Application Installation follow-up Handset feedback (push-registry) |
| Payment | Customer uses their phone to pay: it is fast, convenient and it fits the modern lifestyle | Off-line counter reset Smart MIDlet Mifare and Calypso OTA provisioning |
| Transit | Customer uses phone for transit and top-up over the air when the value runs low | Top-up gateway for OTA stored value top-up Tag reading user interface |
| Rewards | Customer accesses customized information and personalized offers through interactive billboards | Customised tag campaigns management Coupons download, store & redeem mechanism Over-The-Air immediate blocking |
| S.O.S | When customer loses their mobile phone, NFC applications are immediately blocked OTA. The same applications can be easily re-downloaded on a new device. | Routing messages to parties Re-issuance management Life cycle management |

In the case of the present invention, TSM features can include the downloading of specific applications to manage the environments related to each partition. This means the keys and the access rights for each partition. A TSM will handle also the NFC application which allows the automatic switching from one partition to another when a mobile phone receives a signal from a NFC tag. A TSM will also manage, over the air, the life cycle of the NFC mobile to support enrolment, downloads, updates, lost devices, end of life.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof

We claim:

1. A method of accessing a partition from a plurality of partitions, wherein each of the plurality of partitions is a separate memory area, wherein the partition is accessed from a mobile communication device comprising an identification module, wherein the mobile communication device is used by a user, the method comprising:
receiving a passcode at the mobile communication device, wherein the passcode is entered by the user;
verifying the passcode in the identification module;
in response to determining that verification of the passcode by the identification module is positive, sending data specifying the partition and an identification code from the identification module to a partition entry module, wherein the identification code corresponds to or is based on identification data of the identification module;
receiving, by the partition entry module, the data specifying the partition, from the identification module;
receiving, by the partition entry module, the identification code, from the identification module;
determining, by the partition entry module, whether access to the partition is to be allowed or denied, by verifying the identification code received from the identification module and the data specifying the partition received from the identification module; and
wherein the partition entry module allows access to the partition in response to determining that verification of the identification code and the data specifying the partition is positive, and denies access to the partition in response to determining that verification of the identification code and the data specifying the partition is not positive.

2. A method as claimed in claim 1, wherein the identification module is or comprises a removable identification module, a remote identification module, a SIM card, hardware, a secure element, a trusted execution environment, or a software SIM.

3. A method as claimed in claim 1, further comprising generating the identification code in the identification module based on the data specifying the partition.

4. A method as claimed in claim 1, wherein the identification code is a certificate generated from identification data of the identification module.

5. A method as claimed in claim 1, wherein the identification code is received from and corresponds to a SIM card in the mobile communication device.

6. A method as claimed in claim 1, wherein the mobile communication device comprises keys and/or a touch-sensitive screen, and the passcode is received when a user presses the keys and/or the touch-sensitive screen so as to enter the passcode.

7. A method as claimed in claim 1, wherein the identification code is generated by passing the passcode through an algorithm to create a hash.

8. A method as claimed in claim 7, wherein the algorithm comprises an encryption algorithm.

9. A method as claimed in claim 8, wherein the encryption algorithm is a PKI encryption algorithm.

10. A method as claimed in claim 7, wherein the hash is compared with a predefined hash for the partition and access to the partition is allowed only upon determining that the two hashes match.

11. A method as claimed in claim 1, wherein the data specifying the partition is received from a signal-emitting device.

12. A method as claimed in claim 11, wherein the signal-emitting device comprises a NFC tag.

13. A method as claimed in claim 1, comprising decrypting any encrypted content stored in an accessed partition.

14. A method as claimed in claim 1, further comprising sending or displaying a message indicating that access to the partition specified by the data is not allowed when access to the partition specified by the data is not allowed.

15. A method as claimed in claim 1, wherein the data specifying the partition and the identification code are sent from the identification module to the partition entry module via a secure channel therebetween.

16. A method as claimed in claim 15, wherein the secure channel is created by a mutual authentication process between the identification module and the partition entry module.

17. A method as claimed in claim 1, further comprising encrypting the data specifying the partition and/or the identification code before sending the data specifying the partition and/or the identification code to the partition entry module.

18. A method as claimed in claim 1, further comprising switching partition automatically at a predefined time.

19. A method as claimed in claim 1, wherein different telephone numbers are associated with different partitions on a single mobile communication device.

20. A system comprising a mobile communication device comprising an identification module and a server comprising a partition entry module for controlling entry to a plurality of partitions, wherein each of the plurality of partitions is a separate memory area, wherein the mobile communication device is used by a user,
wherein the identification module is arranged to:
receive a passcode, wherein the passcode is entered by a user;
verify the passcode, and, in response to determining that verification of the passcode is positive, send data specifying a partition and an identification code to the partition entry module, wherein the identification code corresponds to or is based on identification data of the identification module;
wherein the partition entry module is arranged to:
receive the data specifying the partition from the identification module associated with the mobile communication device;
receive the identification code from the identification module associated with the mobile communication device;
determine whether access to the partition is to be allowed or denied by verifying the identification code received from the identification module and the data specifying the partition received from the identification module; and allow access to the partition in response to determining that verification of the identification code and the data specifying the partition is positive, and deny access to the partition in response to determining that verification of the identification code and the data specifying the partition is not positive.

21. A system as claimed in claim 20, wherein the identification module is or comprises a removable identification module, a remote identification module, a SIM card, hardware, a secure element, a trusted execution environment, or a software SIM.

22. A system as claimed in claim 20, wherein the identification module is arranged to verify the data specifying the partition and the identification code to determine whether access to the partition specified by the data is to be allowed.

23. A system as claimed in claim 20, wherein the identification module is arranged to generate the identification code based on the data specifying the partition.

24. A system as claimed in claim 20, wherein the identification code is a certificate generated from identification data of the identification module.

25. A system as claimed in claim 20, wherein the identification code is received from and corresponds to a SIM card in the mobile communication device.

26. A system as claimed in claim 20, wherein the mobile communication device comprises keys and/or a touch-sensitive screen, and the partition entry module and/or the identification module is arranged to receive the passcode when a user presses the keys and/or the touch-sensitive screen so as to enter the passcode.

27. A system as claimed in claim 20, wherein the partition entry module and/or the identification module comprises a hash creation module, the hash creation module being arranged to pass the identification code and the passcode through an algorithm to create a hash.

28. A system as claimed in claim 27, wherein the algorithm comprises an encryption algorithm.

29. A system as claimed in claim 28, wherein the encryption algorithm is a PKI encryption algorithm.

30. A system as claimed in claim 27, wherein the partition entry module comprises a verification module arranged to compare the hash with a predefined hash for the partition, and to allow access to the partition upon determining that the two hashes match.

31. A system as claimed in claim 20, wherein the mobile communication device comprises a receiver arranged to receive the data specifying the partition from a signal-emitting device.

32. A system as claimed in claim 31, wherein the signal-emitting device comprises a NFC tag.

33. A system as claimed in claim 20, wherein the mobile communication device comprises decryption means for decrypting any encrypted content of an accessed partition.

34. A system as claimed in claim 20, wherein the mobile communication device is arranged to send or display a message indicating that access to the specified partition is not allowed when access to the partition specified by the data is not allowed.

35. A system as claimed in claim 20, wherein the identification module is arranged to send the data specifying the partition and the identification code to the partition entry module via a secure channel.

36. A system as claimed in claim 35, wherein the secure channel is created by a mutual authentication process between the identification module and the partition entry module.

37. A system as claimed in claim 20, further comprising means for encrypting the data specifying the partition and/or the identification code before sending the data specifying the partition and/or the identification code to the partition entry module.

* * * * *

UNITED STATES PATENT AND TRADEMARK OFFICE
CERTIFICATE OF CORRECTION

| | |
|---|---|
| PATENT NO. | : 10,979,550 B2 |
| APPLICATION NO. | : 14/380120 |
| DATED | : April 13, 2021 |
| INVENTOR(S) | : Christopher Iain Johnston et al. |

It is certified that error appears in the above-identified patent and that said Letters Patent is hereby corrected as shown below:

On the Title Page

(73) Assignee, delete "TapNav Ltd, Walton-on-Thames (GB)" and insert --Liberty Vaults Limited, London (GB)--.

Signed and Sealed this
Thirteenth Day of September, 2022

Katherine Kelly Vidal
*Director of the United States Patent and Trademark Office*